United States Patent [19]

DiMatteo et al.

[11] 4,269,513
[45] May 26, 1981

[54] ARRANGEMENT FOR SENSING THE SURFACE OF AN OBJECT INDEPENDENT OF THE REFLECTANCE CHARACTERISTICS OF THE SURFACE

[75] Inventors: Paul L. DiMatteo, Huntington; Joseph A. Ross, Fort Salonga; Howard K. Stern, Greenlawn, all of N.Y.

[73] Assignee: Solid Photography Inc., Melville, N.Y.

[21] Appl. No.: 4,301

[22] Filed: Jan. 18, 1979

Related U.S. Application Data

[63] Continuation-in-part of Ser. No. 608,265, Aug. 27, 1975, Pat. No. 4,175,862.

[51] Int. Cl.$^3$ .................... G01B 11/00; G01B 11/24
[52] U.S. Cl. .................... 356/376; 250/558; 356/375
[58] Field of Search .................... 356/375–376, 356/1, 152; 250/558

[56] References Cited

U.S. PATENT DOCUMENTS

| | | | |
|---|---|---|---|
| 3,541,351 | 11/1970 | Mansson | 307/261 |
| 3,799,675 | 3/1974 | Johnson et al. | 356/152 |
| 3,866,052 | 2/1975 | DiMatteo et al. | 356/2 |

OTHER PUBLICATIONS

Will et al., "Grid Coding: A Novel Technique for Image Processing", Proc. IEEE, vol. 60, 6-1972, pp. 669–680.

*Primary Examiner*—John K. Corbin
*Assistant Examiner*—Wm. H. Punter
*Attorney, Agent, or Firm*—Max Fogiel

[57] ABSTRACT

A plurality of projectors are positioned in spaced relationship about an object with a surface to be geometrically analyzed. The projectors have cooperating masks which project onto the object illuminated patterns that subdivide the object into predetermined sections. Each mask has a predetermined pattern of sections, and is applied in sequence. The masks are cooperatively advanced in the projectors, with a separate illuminating pattern prevailing on the object each time that the masks are advanced. The combinations of the patterns on the masks define closely-spaced sections subdividing the object. The patterns are coded so that each section is uniquely defined in coded form. Cameras having the entire object within their field of view, photograph the object each time a separate mask is applied. To sense sections of the surface independent of the reflectance characteristics of the surface, the projectors direct two separate illuminating signals at the object surface. The two illuminating signals are inversely related to each other, and after they are recorded by the cameras, the recorded signals are subtracted from each other to result in a waveform having points at which the subtraction yields zero values. These points are then used to define the projection field.

9 Claims, 8 Drawing Figures

ARRANGEMENT FOR SENSING THE SURFACE OF AN OBJECT INDEPENDENT OF THE REFLECTANCE CHARACTERISTICS OF THE SURFACE

BACKGROUND OF THE INVENTION

This present application is a continuation-in-part of the parent application Ser. No. 608,265 filed Aug. 27, 1975, now U.S. Pat. No. 4,175,862.

In the reproduction or fabrication of objects with complex surfaces, it is often essential to determine the spatial locations of points on the surface. In order to reproduce or fabricate a surface with substantial precision, it is necessary to specify a substantially large number of closely-spaced points.

Heretofore, the measurements of points on a complex surface was carried out in a laborious manner by recording the positions of the points methodically until the surface has been specified with the required amount of precision. The taking of measurements of the points on the surface often involved making contact with the surface with an instrument, for example. The final amount of recorded data, furthermore, was voluminous and difficult to analyze. In view of the large amount of data which had to be recorded with respect to a large number of points in order to achieve a predetermined precision, it was particularly susceptible to the introduction of measuring and recording errors.

Accordingly, it is an object of the present invention to provide an arrangement in which an object is subdivided into a substantially large number of sections, so that points on the surface of the object may have their positions sensed or found and determined with substantially high resolution.

Another object of the present invention is to provide an arrangement in which each of the subdivided sections of the object is assigned a predetermined code which defines the section uniquely from the other sections.

A further object of the present invention is to provide an arrangement of the foregoing character in which the object is subdivided into sections with a minimum number of masks applied to achieve a predetermined resolution of sections and accompanying precision.

A still further object of the present invention is to provide an arrangement, as described, in which the sections of the object are sensed independent of the reflectance characteristics of the object surface.

SUMMARY OF THE INVENTION

The objects of the present invention are achieved by arranging a plurality of projectors with masks about the object with the surface to be geometrically analyzed. Each projector projects a collimated beam through the respective mask and applies, thereby, a projected pattern onto the object, which subdivides the object into predetermined sections. For each mask that is applied, the projector illuminates preselected sections of the object. The illuminated and non-illuminated sections combine to form a predetermined pattern corresponding to an assigned code. The masks are advanced in the projector in sequence, and produce a separate pattern of illumination on the object for each applied mask. The different patterns, when taken in combination, subdivide the object into a substantially large number of sections, in accordance with a predetermined digital code. The code is selected, in accordance with the present invention, so that a large number of subdivided sections are obtained for a relatively few number of masks or projected patterns on the object.

Each pattern of sections associated with a mask, is photographed or recorded selectively by cooperating cameras which have the entire surface within their field of view. The photographs taken by the cameras may be correlated to photographs taken similarly of a reference object to establish the spatial locations of points on the surface of the object.

The projectors spaced about the object with the surface to be analyzed, have cooperating masks so that the illuminated pattern from one projector cooperates correspondingly with the illuminated pattern of the remaining projectors. The plurality of projectors positioned about the object, serve to cover the entire surface of the object.

Selective illumination of the surface by the projectors may be carried out by any one of various forms of electromagnetic radiation available, and the subdivision of the object into sections may be carried out along advantageous axes.

To sense the illuminated sections of the object independent of the reflectance characteristics of the object surface, the projectors direct separate illuminating signals onto the object surface. The two signals are in inverse relationship to each other, and after these two separate signals are recorded by the cameras, they are subtracted from each other. The subtraction process results in a waveform having points at which the subtraction yields zero values. These points are used to define the intersection of the projection field with the object.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 7 is a plan view of projector masks for producing light patterns on the object surface corresponding to the waveforms in FIG. 4a.

DESCRIPTION OF THE PREFERRED EMBODIMENTS

Figure 1:
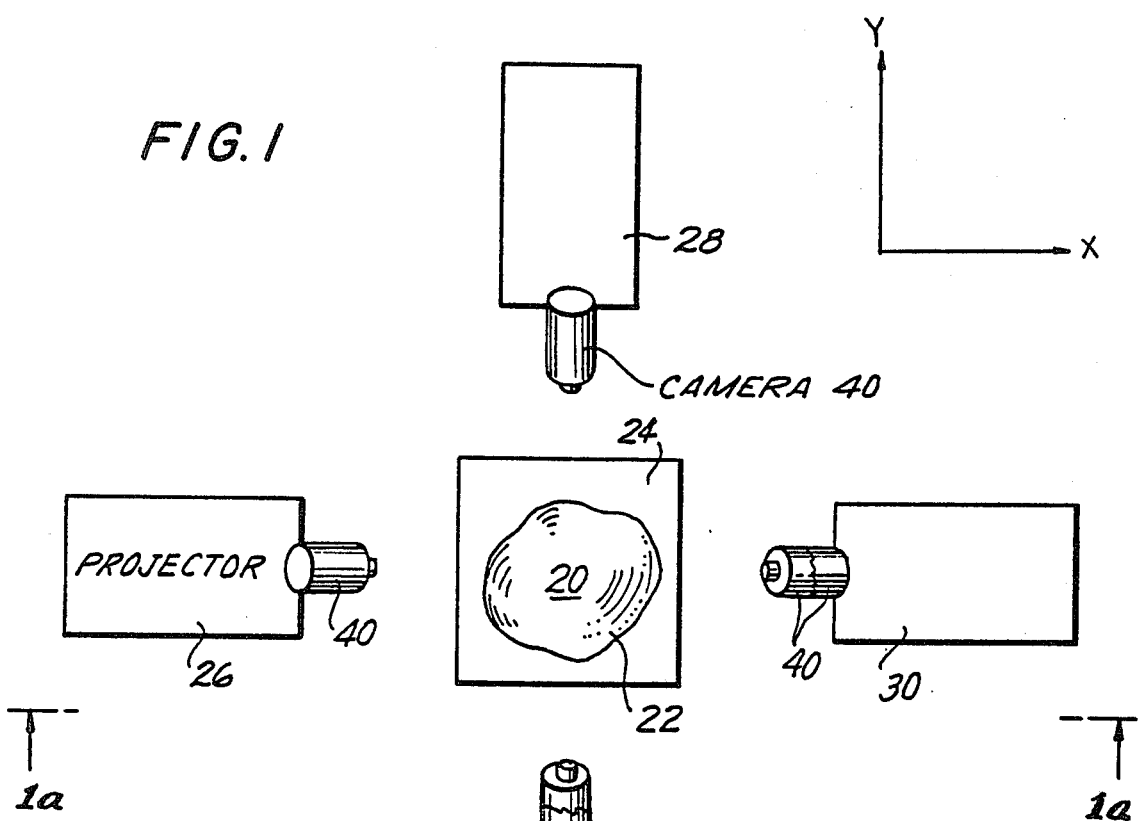
FIG. 1 is a schematic plan view and shows the relative arrangement of the surface to be analyzed or investigated, the projectors, and the cameras, in accordance with the present invention.
Figure 1A:
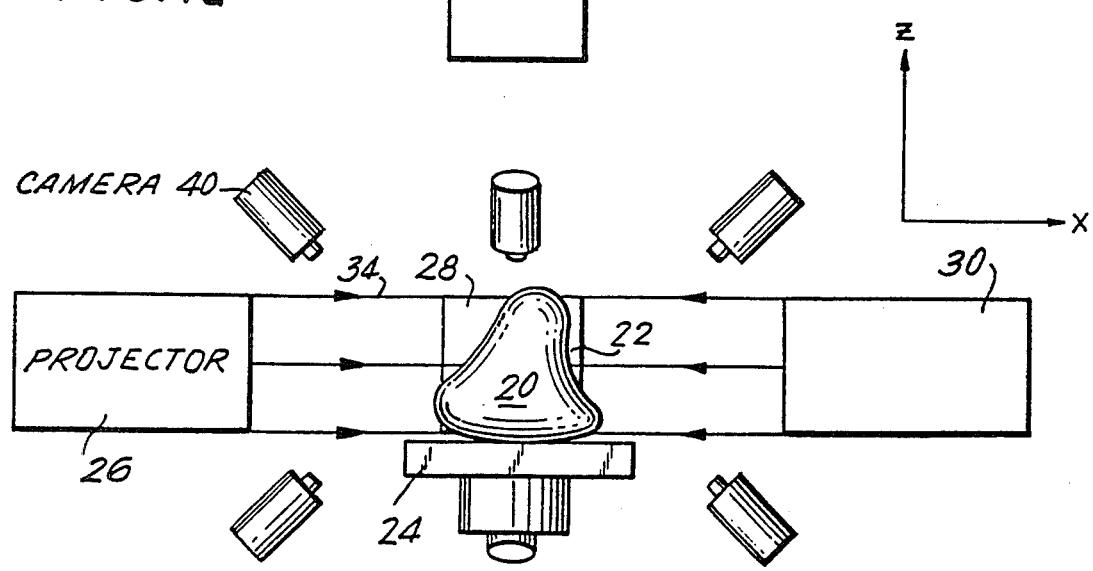
FIG. 1a is a schematic elevational view taken along line 1a—1a in FIG. 1.

Referring now to the drawing and in particular to FIG. 1, an object 20 with surface 22 to be geometrically analyzed, is placed on a support 24. Projectors 26, 28, 30, 32 are positioned in spaced relationship about the object 20 for the purpose of covering the entire surface of the object or a predetermined portion thereof. Each projector applies a collimated illuminating beam 34 to the object 20. In the paths of the collimated illuminating beams, are masks 36 which may be advanced in sequence on the projectors.

Figure 3:
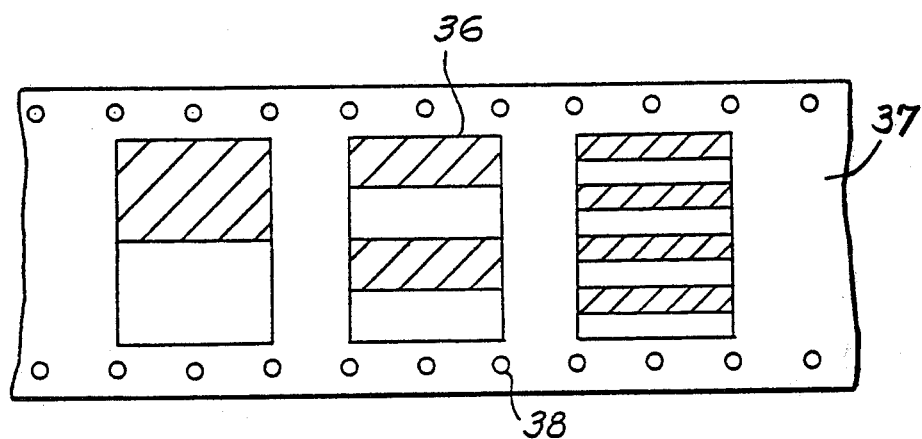
FIG. 3 is a partial plan view of coding masks on a carrier transported in the projectors of FIG. 1.

Each mask 36 may be conveniently placed on a rolled strip of film 37, as shown in FIG. 3 for example. The masks may be advanced in sequence in the respective projector, in an accurately registered manner, by means of sprocket holes 38 located along the edges of the strip of film. The film can be rolled and stored on reels in a conventional manner. The advancing or transporting of film in the light path of a projector is well known in the art, and for this reason is not described in further detail here. At the same time, separate slides each containing a separate mask may be used in conjunction with a projector instead of a strip of film containing a plurality of sequenced masks.

During the period of time that a particular mask is present in a projector, preselected portions of the surface 22 are illuminated by the illuminating beam applied by the projector through the mask. The illumination of the preselected sections is carried out on the basis that the surface 22 is to be subdivided into a substantially large number of sections for a relatively few number of masks. Thus, a relatively few number of masks or illuminating patterns used in conjunction with the projector, provide sufficient data for subdividing the surface 22 into a substantially large number of sections or intervals to obtain sections of high resolution. When the projectors 26, 28, 30, and 32 are operated cooperatively, all projectors are provided with identical masks having identical patterns thereon. This arrangement permits covering the surface of the object and avoids shadow effects which may arise when using only a single projector.

The relationship between the number of masks 36 used in conjunction with a projector, and the number of subdivided sections of the surface 22 is obtained in the following manner.

Figure 2:
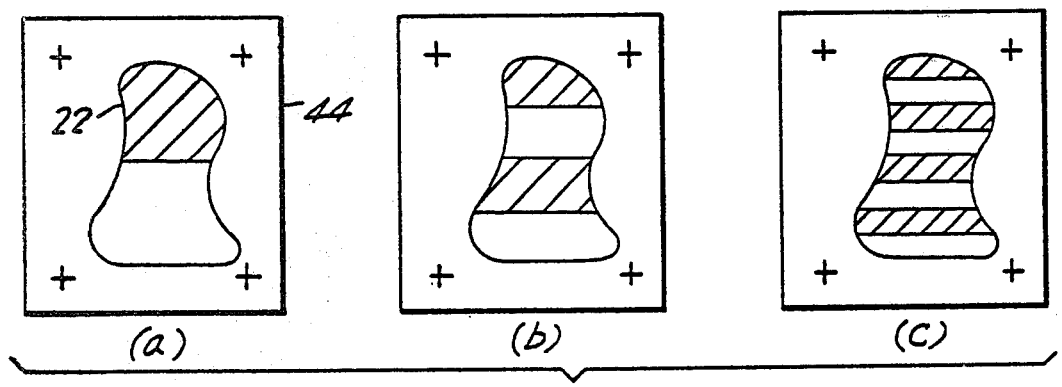
FIG. 2 shows plan views of typical photographs taken by a camera in the arrangement of FIG. 1.

If the surface 22 is to be subdivided into N sections corresponding to a predetermined precision of resolution, then this quantity N may be expressed by the series of binary terms $N = 2^0 + 2^1 + 2^2 + 2^3 + 2^4 \ldots$ From this series of binary terms, it may be seen that a substantially large number N may be obtained for a relatively few terms present in the sequence. To apply this principle to the present invention, each binary term in the sequence is made to correspond to a single mask pattern projected on the surface 22. For each mask, a predetermined pattern of illumination is applied, corresponding to the particular binary term involved. Thus, for the binary term $2^1$, for example, the illuminating pattern of FIG. 2a is produced. In this pattern, the surface 22 is subdivided into two sections or intervals. The illuminated section in FIG. 2 is shown in cross-hatched form. The non-illuminated section is left vacant. In a similar manner, the binary term $2^2$ is represented by the illuminating pattern of FIG. 2b. In FIG. 2b, the surface 22 is subdivided into four sections. FIG. 2c corresponds, accordingly, to the binary term $2^3$, and in this FIG. 2c, the surface 22 is subdivided into eight sections or intervals.

Each illuminating pattern as represented by FIGS. 2a, 2b, and 2c, for example, is photographed by cameras 40 which have the entire surface 22 within their field of view. Whereas only three patterns are represented in the drawing to correspond to three separate binary terms, in practice the cameras 40 photograph each pattern separately for as many binary terms as are necessary to obtain the quantity N. For each photograph taken by the cameras 40, moreover, the projectors 26, 28, 30, 32 project onto the object, a single pattern of a single mask.

The sectionalized pattern on the masks may be obtained, for example, by producing the film or slides with alternating sections or areas that will transmit and inhibit the transmission of light. The photographs 44 taken by the cameras 40 of the sectionalized patterns appearing on the object 20, are shown in FIG. 2.

In the use of the pure binary code to express the number N of subdivisions of the surface 22, as described above, each subdivision or band is assigned a unique code which serves to identify uniquely each band from the other remaining bands. Thus, bands numbered 5, 6 and 7 have, respectively, assigned codes 101000, 011000, and 111000. In a similar manner, every other band from the first one to the last one (band N) has a uniquely assigned binary code.

In accordance with the present invention, therefore, a relationship exists between the binary coded bands and the number of photographs 44 taken by the cameras 40. The relationship makes it possible for a relatively small number of photographs to include complete information of a substantially large number of bands. Thus, only ten photographs are required, for example, to specify completely 1,000 bands. The coded information on the bands may be inserted into a computer and applied in the following manner.

Figure 6:
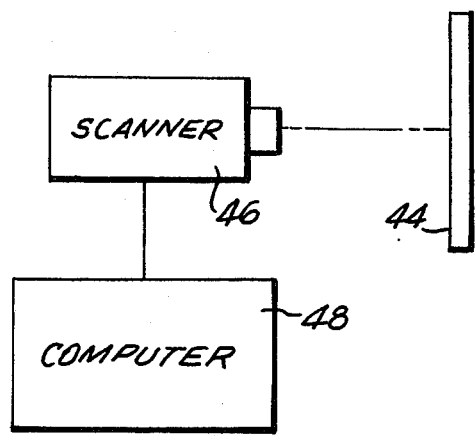
FIG. 6 is a schematic view and shows the arrangement for scanning the photographs of FIG. 2.
Figure 5:
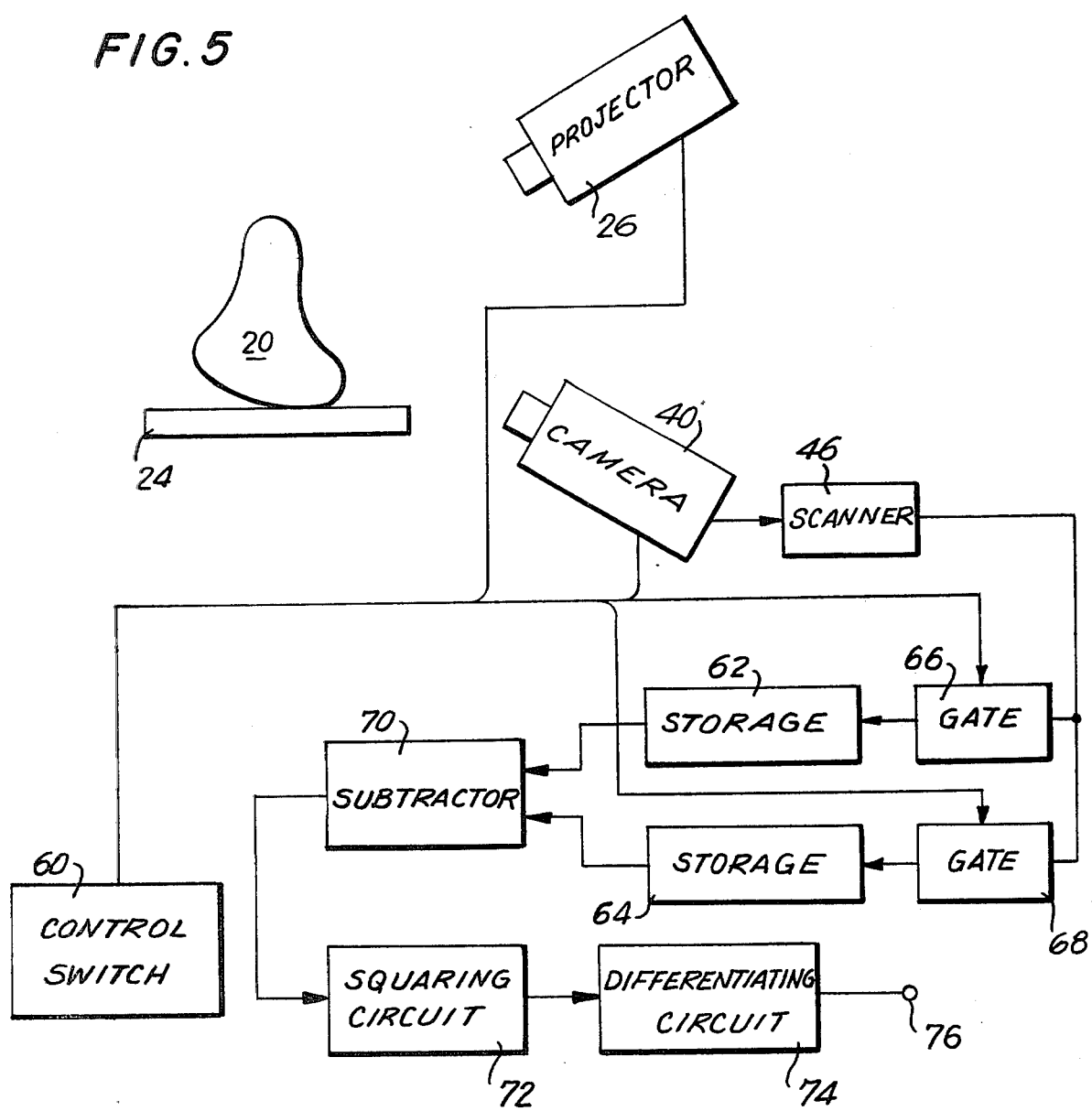
FIG. 5 is a schematic view and shows the arrangement for processing signals with waveforms shown in FIG. 4.

The photographs 44 are scanned in sequence by means of a photoelectric cell or electron beam scanner 46 or other conventional scanning device, for example, and the scanned information is inserted into a computer 48, as shown in FIG. 6. A point P, for example, on the surface 22 will also appear in the photographs 44 taken by the cameras 40. Depending upon the particular photograph taken in the sequence of patterns as shown in FIG. 2, for example, the point P will appear within different shaded and non-shaded bands. If a shaded band is assigned the digit "1" and a non-shaded band is assigned the digit "0", then referring to FIG. 2, it is seen that in FIG. 2a the point P lies within a shaded band, so that a "1" may be assigned to FIG. 2a. Similarly, since the point P lies within a non-shaded band in FIG. 2b and within a shaded band once again in FIG. 2c, the digits "0" and "1" may be assigned, respectively, to FIGS. 2b and 2c in relation to point P. If the point P does not appear subsequently within a shaded band in any of the additional photographs which may be taken by the camera 40, then the position of the point P may have the code 101000 assigned to it. From this latter code, it may be observed that this binary code represents band number 5, and therefore point P must lie within this band number 5.

In practice, the scanner 46 detects or senses the point P on the photographs 44 which are scanned in sequence. The scanner 46 senses whether the point P lies within a shaded or a non-shaded band. The resultant information is inserted into the computer 48. The computer correlates the sequence of the photographs scanned, in relation to whether point P appears in a shaded or non-shaded band, and generates from this the binary coded number which defines a particular number of the band in which point P lies, such as band number 5 in the preceding example. From the information stored in the computer, the surface 22 may be readily reconstructed since each band is uniquely defined and the point P, therefore, will appear in the correct band on the reconstructed surface.

The scanning of photographic images for sensing information thereon as, for example, the point P, is well known in the art and is, for this reason, not described in further detail here. Furthermore, the scanner 46 may be in the form of an electron beam scanner, photoelectric or other optical scanner, for example. Registration marks 45 provided on the photographs serve as a reference for positioning the photographs in predetermined location prior to scanning.

Depending on the surface reflectance characteristics of the object, the patterns recorded by the cameras are modulated by the reflectance characteristics, so that the records or photographs have their information content distributed over a substantially wide range of density if film is used, or over a wide range of amplitudes if video tape is used, for example. Such distribution makes machine reading of the records, as in FIG. 6, difficult because of the wide range of amplitudes that are present. To avoid this problem, in accordance with the present invention, the projectors direct or project illuminating signals 50 and 52 in sequence at separate intervals. These two illuminating signals are inversely related to each other. After recording by the camera, the relationship of these two signals is shown in FIG. 4a. In FIG. 4a, the recorded signals receive after reflection from a portion of the object surface with substantially high reflectance characteristics, are shown in the portion of the diagram designated by the horizontal distance H. These same inversely-related signals as recorded from a portion of the object surface with substantially low reflectance, are illustrated in the portion of FIG. 4a designated by the horizontal distance L. It may be seen from a comparison of these two portions in FIG. 4a, that substantially different amplitudes can be obtained from surface portions having different reflectance characteristics.

In order to define the intersection of the projection field with the object surface, the two signals 50 and 52 are subtracted from each other, and this subtraction process results in the waveform 54 shown in FIG. 4b. In carrying out this subtraction process, it is essential to note that both signals 50 and 52 are signals of the same or positive potential, as shown in FIG. 4a. Thus, each of the two signals 50 and 52 have instantaneous values above zero level.

The subtraction process resulting in the waveform 54 in FIG. 4b, provides points at which the signals 50 and 52 are equal. These points at which signals 50 and 52 are equal, appear as points of zero value on the waveform 54. These points, furthermore, designate the intersections of the projection field with the object surface.

In considering, furthermore, the two portions of FIG. 4a designated by the horizontal distances H and L, it is noted that the waveforms of the signals in the portion L, correspond to those signals which are received when a surface portion has been coated with a substance or layer of low reflectance, for example. Accordingly, even though the same surface may have different reflectance coatings applied to it, which will result in different values of signals, the zero points on the waveform 54 remain uniquely at the same locations. As a result, these zero points can be used to define the intersections or borders of the projection field. Accordingly, for example, the zero points in the portion designaged L would have the same location if it were a high reflectivity region, even though values of the signals 50, 52 and 54 increase due to different reflectance characteristics.

To identify the zero points so that they may be used for processing by a computer, for example, the waveform 54 is squared so as to result in the waveform 56 shown in FIG. 4c. By differentiating this waveform 56, furthermore, the zero points, corresponding to the vertical edges of the waveform 56, may be well defined by impulses 58 shown in FIG. 4d.

In view of the subtraction process of the inversely-related signals 50 and 52, the results are independent of noise conditons or ambient lighting which may be present. Stray light from the projector due to scattering or stray reflections within the projector or camera, also do not affect the results. The size of the larger of the two amplitudes 50, 52 is used to delete information from those portions of the camera field of view which are not illuminated by the projector. This results in omitting the case in which there is no object surface or in which background fog is recorded due to ambient lighting which may be present and which has not been applied by a projector.

Figure 4:
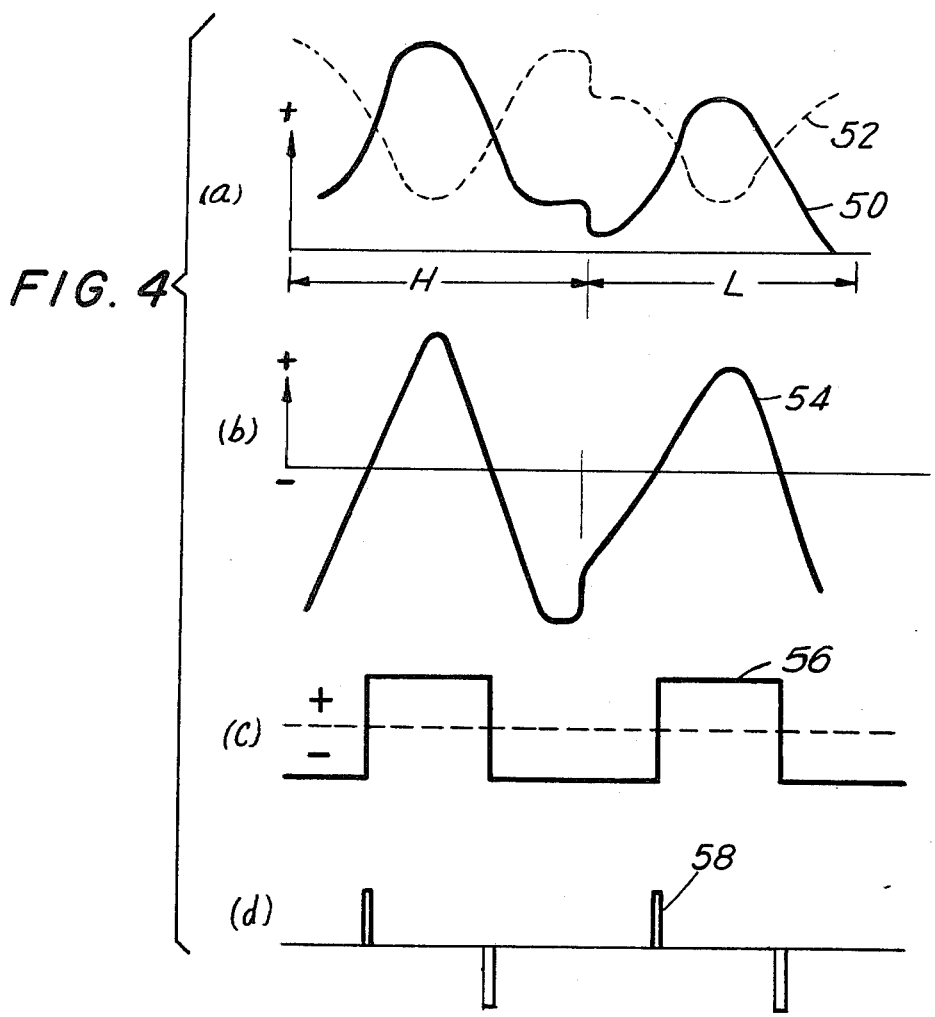
FIG. 4 is a diagrammatic view of related waveforms in the process of obtaining recorded signals which may be dealt with to define the intersection of the projection field with the object surface.

In processing the waveforms shown in FIG. 4, a projector 26 and camera 40, for example, are controlled by a switch 60 to allow the projector to project separately the two inversely-related signals 50, 52, and for the camera to record these two signals separately after having been reflected by the object surface. The switch 60, therefore, coordinates the operation of the projector and camera. After the recordings from the camera are scanned or read by the device 46, the recorded reflected signal corresponding to waveform 50 is stored within the storage unit 62. Similarly, the reflected signal corresponding to waveform 52 is stored in the storage unit 64. Gates 66 and 68 are operated by the switch 60 so as to route the two separate signals into the separate storage units. The gates 66 and 68 may be in the form of, for example, conventional AND type of gates if the data is stored in digital form or conventional analog switches if the data is stored in analog form. The outputs of the storage units 62 and 64 are subtracted from each other in a subtractor 70 so as to result in the waveform 54. Thus, the output of the subtractor corresponds to the waveform shown in FIG. 4b.

After applying the output of the subtractor to a squaring circuit 72, the waveform 56 shown in FIG. 4c is obtained. The impulses 58 shown in FIG. 4d, result after applying the output of the squaring circuit to a differentiating circuit 74. The output 76 may thus be used to define the intersections or borders of the projection field with the object surface.

The functions of the switch 60, storage units 62 and 64, gates 66 and 68, subtractor 70, squaring circuit 72, and differentiating circuit 74 can all be performed by a computer through conventional computer circuit elements already known in the art. For this reason, these circuit elements are not described in further detail here.

Figure 7:
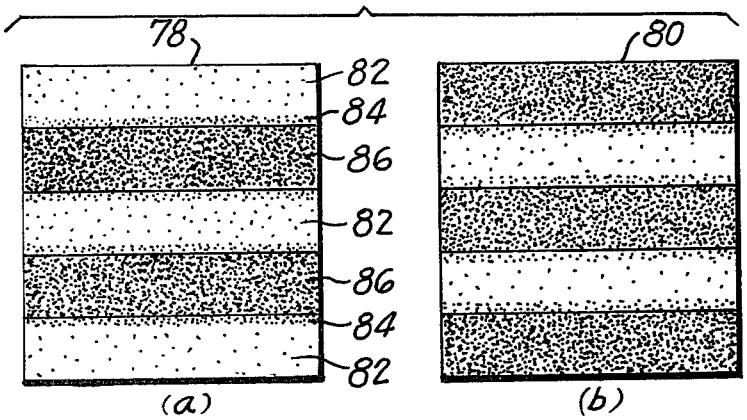

For purposes of projecting the two separate waveforms 50 and 52 onto the object surface, the projector may operate in conjunction with masks as shown in FIG. 7 which control the projector so as to apply the two inversely-related patterns to the object. Thus, FIGS. 7a and 7b may be related to waveforms 50 and 52, respectively, in FIG. 4a. The masks 78 associated with the projector, for example, may have bands of lowest density areas 82, low density areas 84, and high density areas 86. Shading has been used in FIGS. 7a and 7b to distinguish among the different density areas. Through the use of these same types of density areas, projector mask 80 may be produced corresponding to waveform 52.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A method for defining the intersection of a projection field with the surface of an object independent of reflectance characteristics of the object surface, comprising the steps of: irradiating said surface with a first irradiating pattern; irradiating said surface with a second irradiating pattern related inversely to said first pattern; recording said first pattern after reflection from the object surface; recording said second pattern after reflection from the object surface; comparing the two recorded patterns; and determining from the comparing step the points at which the two recorded patterns have substantially equal values, said points defining the intersection of said projection field with said surface independent of reflectance characteristics of the surface.

2. A method as defined in claim 1, wherein said comparing step comprises subtracting one recorded pattern from the other, said points corresponding to zero values in the remainder resulting from the subtracting step.

3. A method as defined in claim 2, including the step of deriving a remainder waveform from said subtracting step; and transforming the remainder waveform into a square wave waveform, vertical sides of said square wave waveform corresponding to said points.

4. A method as defined in claim 3, including the step of differentiating said square wave waveform for obtaining impulses corresponding to said vertical sides and thereby to said points.

5. An arrangement for defining a surface of an object independent of reflectance characteristics of the object surface, comprising: means for irradiating said surface with a first irradiating pattern and thereafter irradiating said surface with a second irradiating pattern, said second irradiating pattern being inversely related to said first pattern; means for recording said first pattern after reflection from the object surface and thereafter recording said second pattern after reflection from the object surface; comparison means connected to said recording means for comparing the two recorded patterns; and means connected to said comparison means for determining from the comparison the points at which the two recorded patterns have substantially equal values, said points defining borders of surface independent of reflectance characteristics of the surface.

6. An arrangement as defined in claim 5, wherein said means for comparing the two recorded patterns subtracts one recorded pattern from the other to obtain a remainder, said points corresponding to zero values of said remainder.

7. An arrangement as defined in claim 6 including squaring means connected to said comparison means for obtaining a square wave waveform of said remainder.

8. An arrangement as defined in claim 7 including differentiating means connected to an output of said squaring means for differentiating said square wave wave form for obtaining impulses corresponding to vertical sides of said square wave, said vertical sides of said square wave corresponding to said points.

9. An arrangement as defined in claim 8 including storage means connected between said recording means and said comparison means.

* * * * *